No. 753,300. PATENTED MAR. 1, 1904.
M. NIRDLINGER.
APPARATUS FOR THE MANUFACTURE OF VEHICLE TIRES.
APPLICATION FILED MAY 21, 1900. RENEWED JULY 21, 1903.
NO MODEL.
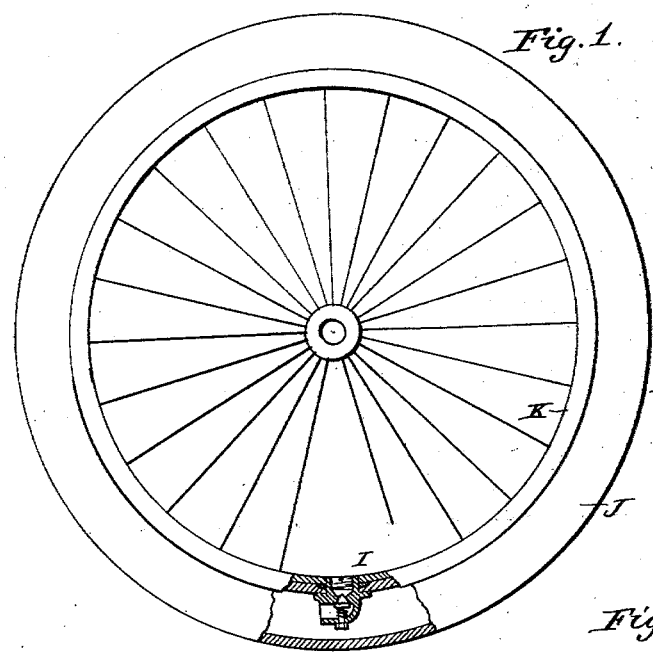
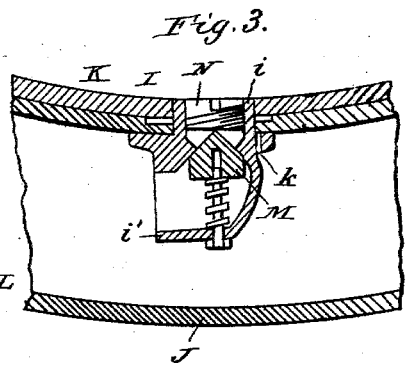
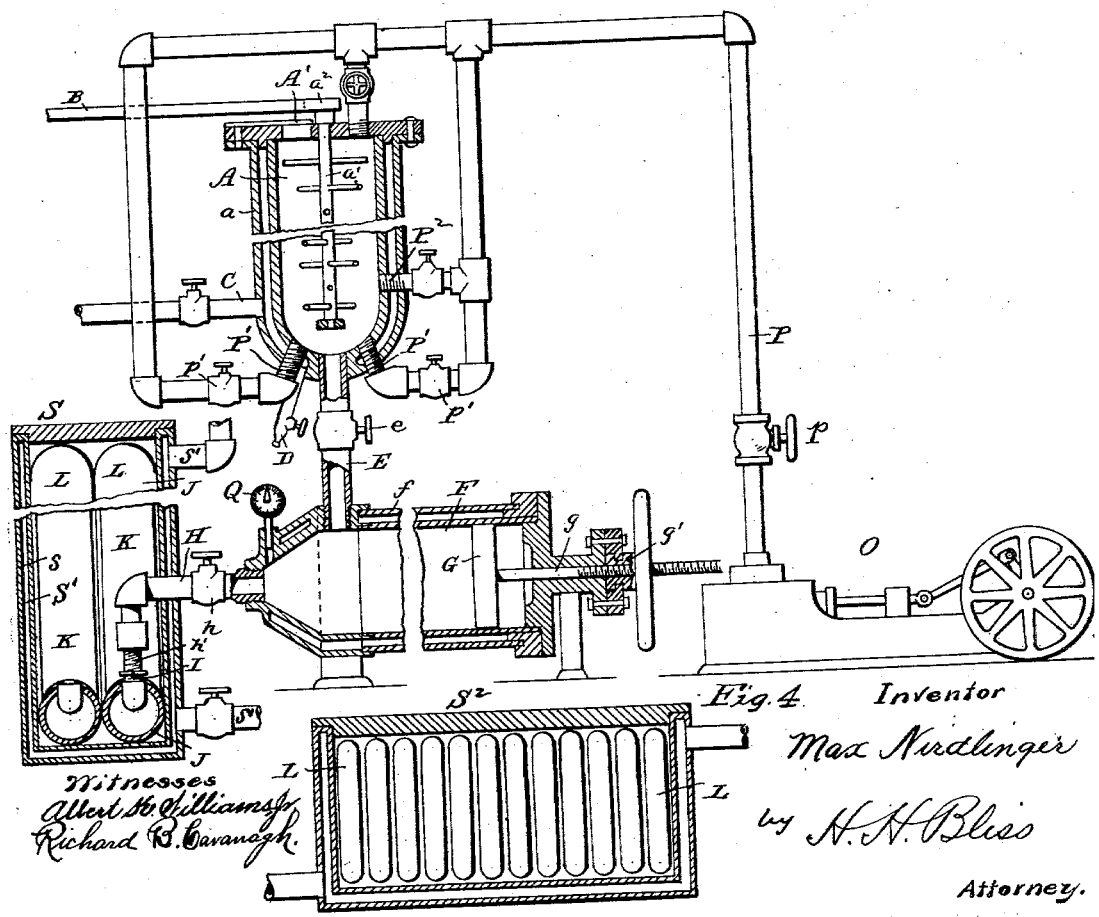
Witnesses
Albert H. Williams Jr.
Richard B. Cavanagh
Inventor
Max Nirdlinger
by H. H. Bliss
Attorney.

No. 753,300.

Patented March 1, 1904.

UNITED STATES PATENT OFFICE.

MAX NIRDLINGER, OF PHILADELPHIA, PENNSYLVANIA.

APPARATUS FOR THE MANUFACTURE OF VEHICLE-TIRES.

SPECIFICATION forming part of Letters Patent No. 753,300, dated March 1, 1904.

Application filed May 21, 1900. Renewed July 21, 1903. Serial No. 166,498. (No model.)

*To all whom it may concern:*

Be it known that I, MAX NIRDLINGER, a citizen of the United States, residing at Philadelphia, in the county of Philadelphia and State of Pennsylvania, have invented certain new and useful Improvements in Apparatus for the Manufacture of Vehicle-Tires, of which the following is a specification, reference being had therein to the accompanying drawings.

My present invention relates to an improved apparatus for the manufacture of vehicle-tires, intended for use in that part of such manufacture as consists in the production of a viscid semifluid filling composition and the introduction or injection under pressure of such composition while in a fluid or semifluid condition into a flexible tire tube, covering, or envelop for the ultimate production of a vehicle-tire having the desirable qualities of permanent elasticity and great durability.

The apparatus comprises three principal parts—a vessel or kettle within which the ingredients of the composition may be thoroughly mixed and maintained at the necessary temperature and formed into a mass containing numerous air or gas spaces or cells evenly distributed throughout the composition, an air-pump or pressure device by which air may be introduced into the composition or mass while it is being stirred or caused to act upon such mass to force it under pressure from said kettle, and a charging vessel communicating with the mixing kettle or tank adapted to receive the aerated or spongy composition therefrom and to deliver the same under pressure to the tire-tube which is to be filled.

In order to make the invention more clearly understood, I have shown in the accompanying drawings means for carrying the same into practical effect without limiting my improvements in their useful applications to the particular construction which for the sake of illustration I have delineated.

In said drawings, Figure 1 is a side view of a vehicle-wheel provided with a tire adapted to be filled by a composition produced and delivered by my improved apparatus, a part of said wheel and tire being shown in section. Fig. 2 is a view, partly in elevation and partly in section and more or less conventional, showing an apparatus embodying my invention. Fig. 3 is a sectional view, on a larger scale, illustrating the filling-tube and pressure-retaining devices applied to the tire. Fig. 4 is a section of a heater wherein the tires are preliminarily treated prior to placing them in the mechanism where they are charged with the filling material.

Referring to said drawings, A indicates a mixing tank or kettle surrounded by a steam-jacket $a$ and having a filling door or aperture at A', the latter being adapted to be tightly closed for the application of air-pressure within the vessel.

$a'$ is an agitating or mixing shaft provided with stirring-blades, which is rotated by a pulley $a^2$ and a belt B.

Steam of the desired temperature is introduced at C and the steam or water of condensation withdrawn from the jacket $a$ at D. It will be understood, however, that other means than steam may be employed for maintaining the kettle A and its contents at the desired temperature.

F indicates a charging vessel communicating with the mixing-tank A by the duct E, the latter being opened and closed by the valve $e$.

While my apparatus may be employed for producing various filler compositions and introducing the same into vehicle-tires, I will describe the invention as employed in connection with the production and charging into vehicle-tires of my improved filling composition described in my other application, Serial No. 17,463. For the production of sixty pounds, more or less, of the composition I take fifteen pounds of glue and soak and soften the same in water or other suitable solvent. Twenty-five pounds of glycerin are placed in the kettle A and heated to about 100° Fahrenheit, and to the same is added the soaked glue. These ingredients are mixed by the stirring device $a'$ and kept at a temperature of about 100° Fahrenheit. I then add to this mixture in the kettle A twenty pounds of saccharine material, such as glucose or grape-sugar in a warmed condition, and all said ingredients thoroughly mixed by the action of the device $a'$, keeping them at about the said temperature. To the mixture is then added a gas-generating substance or composition, such as six ounces of saleratus. The entire mixture is then beaten very rapidly by the stirrer $a'$ until it foams freely. This produces a composition capable of partly hardening or setting to form a permanently-elastic sponge. To the said mixture I further add one ounce of tannin and six and one-half ounces of powdered alum, great care being exercised to keep the ingredients and mixture at about the said temperature. From the time that the first ingredient is placed in the mixing kettle or vessel it is desirable that it and the subsequent ingredients be stirred or agitated moderately. When the time for producing the gas or air spaces or cells in the composition arrives, either by the use of said gas-generating substances or by the injection of compressed air, the stirring of the mixture should be very rapid, thereby promoting the action of the gas-generating substances and the formation of gas or air spaces evenly throughout the mass. The mixture is now ready for delivery to the charging vessel F through the duct E. Such passage of the mixture may be caused by gravity, but preferably by the action of the air-compressor, (conventionally shown at O,) which communicates by a pipe P, controlled by a valve $p$, with the upper part of the kettle A. This air-forcing apparatus may be also used for forcing air into the mixture during its agitation by the stirrer $a'$ for the production in the composition of air spaces or cells, as above described. The charging vessel is also steam-jacketed, as shown at $f$, and is provided with a piston or plunger G, which can be operated in any suitable way—as, for instance, by a screw-rod $g$ and a hand-nut $g'$. The vessel F delivers to a tube or duct H under the control of a valve $h$, the duct H being adapted to be detachably connected to the filling-tube I. The latter is preferably permanently connected with the rubber tube J of the tire or with the felly K of the wheel L, or, as shown, connected with both—that is to say, having a shank part $i$, which engages with the felly K and also passes through the tube J. Preferably the tube I is turned laterally, as shown at $i'$ at Fig. 3, so that the filling material can be turned in the direction of the curve of the tire. At $k$ there is a vent for the air from the chamber in the tube J, and of such vents there may be as many as are found necessary.

The filling-tube I is shown as having a check-valve M, which may be of any suitable sort and which in some cases may be dispensed with.

The duct H, connected with the charging-vessel F, has a coupling-piece $h'$ connected with it by a thread and adapted to be connected by another thread with the filling-tube I. N is a closing piece or cap for the outer end of the filling-tube I. When it is desired to insert filling material into the tube, this cap N is withdrawn and the coupling-piece $h'$ is inserted, as shown in Fig. 2. After the material has been introduced the coupling-piece $h'$ is again withdrawn and the cap N replaced.

At Q there is a gage of any suitable construction by which the degree of pressure that is being exerted can be readily ascertained.

When the mechanism is in operation, a charge of the materials after being properly commingled in the vessel A is, as aforesaid, passed to the charging vessel F, and the latter being properly connected in the way described with a tire-tube the filling composition is forced into the latter by turning the hand-nut at $g'$, which through the piston or plunger G causes the filler to be pressed into the tube. In order to maintain a uniformity of pressure and to continue the effect thereof properly, I employ the above-described air compressing and delivering apparatus. A charge of the filler is first forced into the tube and then held there under pressure until it becomes thoroughly incorporated with all of the interior surfaces and fills the crevices, it being held under pressure while this is being accomplished. Then, if necessary, supplemental charges of the filler are introduced, and these also are subjected to pressure. In some cases the pressure from the piston or plunger G will be sufficient; but I prefer to supplement that device with an air-pressure in the way described.

The tube J to attain the best results should be heated at the time the warmed composition is being introduced, which can be done by either intermittently immersing it in warm water or by having it so supported in a body of hot water that the charging can be effected while it is thus suspended. This heating of the tire-tube is of great importance in that it insures that the body of injected material shall intimately unite with the inner surface of the rubber covering. I prefer to provide a special heater for the tire, in which the tire is contained and heated or previously-imparted heat maintained during the charging operation. In Fig. 2, S is the tire-heater, having an outer jacket $s$, leaving a surrounding space or chamber S'. This heater is raised to and maintained at the desired temperature—say 200° Fahrenheit—by hot air or steam passed through said chamber S' by pipes $s'$. The charging-duct H extends within the heater and is there connected with the tire, as above described. The heater may be made to receive more than one tire or wheel, as shown, so that one or more tires may be heated while another is being charged.

$S^2$ is a preliminary heater in which a considerable number of tires or wheel may be raised to the desired temperature—200° Fahrenheit, more or less—before being placed in the charging-heater S.

Instead of forcing compressed air into the mixing-kettle above the filler and there causing its mixture with the filler material by the action of the beaters one or more jets of compressed air may be forced into the heated and fluid filler below its surface and cut up into small bubbles and evenly mixed with the filler to thoroughly aerate it by a rapid action of the beaters. In Fig. 2, P' indicates two such jet-tubes entering the bottom of the kettle connected with the pipe P and controlled by valves $p'$. Such jet-pipes may be directed upward, as shown at P', or may enter the kettle laterally, as at $P^2$.

The charging-compressor G may be operated by mechanical power, if desired.

What I claim is—

1. In an apparatus for the manufacture of vehicle-tires, the combination of a mixing-kettle, means for heating the same, a stirring device within the kettle, a charging vessel, means for delivering the mixture from the kettle to the charging vessel, and a pressure device in the charging vessel to force the material into the tire, substantially as set forth.

2. In an apparatus for the manufacture of vehicle-tires, the combination of a mixing-kettle, a steam-jacket for heating the same, a stirring device within the kettle, a charging vessel, means for delivering the mixture from the kettle to the charging vessel, and a pressure device in the charging vessel to force the material into the tire.

3. In an apparatus for the manufacture of vehicle-tires, the combination of a mixing-kettle, an air-pressure device communicating with the kettle, a charging vessel communicating with the kettle, means for cutting off such communication, a pressure device adapted to act on the material within the charging vessel, and means for delivering the material from said charging vessel to the tire.

4. In an apparatus for the manufacture of vehicle-tires, the combination with the mixing-kettle and means for forcing air into the same, of a charging vessel communicating with the kettle, a piston within said charging vessel, and means for delivering the material from the charging vessel to the tire-tube.

5. In an apparatus for the manufacture of vehicle-tires, the combination of a mixing-kettle, means for aerating the mixture within the same, a pipe or duct for charging a tire from said kettle, a charging vessel interposed in said pipe, a pressure device within the charging vessel, and means for holding under pressure the aerated filling within the tire.

6. The combination of a mixing-kettle, means for aerating the mixture within the same, a duct for charging a tire from said kettle, a charging vessel interposed in said duct, a pressure device in the charging vessel, and means for holding under pressure the aerated filling within the tire, consisting of a valve carried by said tire, and detachable from said duct.

7. In an apparatus for the manufacture of vehicle-tires, the combination of a mixing-kettle, a charging vessel having communication from the kettle, means for maintaining the tire-tube in a heated condition and a dipe or duct whereby the tire-tube may be charged from said kettle through the charging vessel.

8. In an apparatus for the manufacture of tires, the combination of a mixing kettle or vessel, a pipe or duct for charging a tire from said kettle, a charging vessel interposed in said pipe, and a heater adapted to receive and heat the tire while being charged.

9. In an apparatus for the manufacture of tires, the combination of a mixing kettle or vessel, a heater for the tire, a pipe or duct from said kettle extending within the heater, and a charging vessel interposed in the said pipe to force the material into the tire.

10. In an apparatus for the manufacture of tires, the combination of a mixing kettle or vessel, a heater for the tire, a pipe or duct leading from said kettle and extending within the heater, and means substantially as described for forcing material from the kettle through the duct, into the tire.

11. In an apparatus for the manufacture of tires, the combination of a heating kettle or vessel, a heater for the tire, a pipe or duct leading from the kettle and extending within said tire-heater, a charging vessel interposed in said duct, and means for forcing material from the charging vessel through said duct.

12. In an apparatus for the manufacture of tires, the combination of a heating vessel, a tire-charging duct leading from the same, means for forcing air into the material below its surface, and means for forcing the aerated filler through said duct into the tire.

In testimony whereof I affix my signature in presence of two witnesses.

MAX NIRDLINGER.

Witnesses:
GEO. C. HAZELTON, Jr.,
S. S. WILLIAMSON.